(12) United States Patent
Wilcox et al.

(10) Patent No.: US 6,643,320 B1
(45) Date of Patent: Nov. 4, 2003

(54) RECEIVER FOR DS-CDMA SIGNALS

(75) Inventors: Martin S. Wilcox, Reigate (GB); Andrew T. Yule, Felbridge (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/436,195

(22) Filed: Nov. 8, 1999

(30) Foreign Application Priority Data

Nov. 28, 1998 (GB) ................................................ 9826044

(51) Int. Cl.[7] .......................... H04B 1/69; H04B 7/185; H04B 7/216
(52) U.S. Cl. ...................... 375/150; 375/134; 342/352; 342/357.12; 370/320; 701/214
(58) Field of Search ................................ 342/457, 450, 342/357.06, 357.02, 357.12; 375/134, 350, 136, 147, 150; 455/456, 427; 701/213, 207, 479

(56) References Cited

U.S. PATENT DOCUMENTS

| 5,081,462 | A | * | 1/1992 | Tachita et al. | 342/352 |
| 5,621,416 | A | * | 4/1997 | Lennen | 342/357.12 |
| 5,809,060 | A | * | 9/1998 | Cafarella et al. | 375/146 |
| 5,893,044 | A | * | 4/1999 | King et al. | 701/214 |
| 6,151,353 | A | * | 11/2000 | Harrison et al. | 375/136 |
| 6,404,801 | B1 | * | 6/2002 | Lennen | 375/134 |

OTHER PUBLICATIONS

Abstracts of Japan, 07140224A, "Spread Spectrum Signal Tracking Device", Date of Publication Jun. 2, 1995.

* cited by examiner

Primary Examiner—Stephen Chin
Assistant Examiner—Edith Yeh

(57) ABSTRACT

A receiver for direct sequence spread spectrum code division multiple access signals (DS-CDMA) particularly for GPS signals includes a plurality of correlators. Each correlator includes variable level threshold circuits (29, 30) which follow integrate and dump registers (27, 28). The threshold level is set using the correlation noise level and predicted signal strength.

5 Claims, 2 Drawing Sheets

RECEIVER FOR DS-CDMA SIGNALS

FIELD OF THE INVENTION

The invention relates to a receiver for direct sequence spread spectrum code division multiple access signals (DS-CDMA). The invention particularly but not exclusively, relates to such a receiver for receiving GPS signals. In this respect the term GPS is intended to include not only the US Global Positioning System but also the Russian Global Satellite System (GLONASS) and any other equivalent systems which may be established in the future.

The GPS system is a time of arrival positioning system which uses a nominal constellation of 24 low earth orbit satellites to provide a position fix anywhere on the earth's surface. The satellites broadcast their position and timing information using a direct sequence spread spectrum signal. Currently two frequencies are used in the full system but for low cost civilian use the carrier is at 1575 MHz. The satellites orbits are designed such that provided that there is a clear view of the sky at least five satellites will be in view anywhere at any time. The minimum number of satellites required to be in view for a full position fix is four. These are needed to resolve the three unknown special dimensions and the ambiguity between the receiver clock and satellite clocks.

All of the satellites broadcast on the same frequency using different pseudo random noise (PRN) codes. Thus the down conversion of all the signals can be performed in parallel using a single front end stage. The separation into multiple channels can be carried out at baseband and is normally done in the digital domain.

The GPS signal is a spread spectrum DS-CDMA signal. In order to retrieve the data from this signal it must be correlated with a copy of the PRN code that was used to spread the signal on transmission. This code is known, but the frequency at which the code is being received and the exact timing of the code are not known.

In order to acquire a GPS signal from a satellite, a receiver must identify both the Doppler Shift on the signal and the phase of the satellite PRN code to a high degree of accuracy. If the receiver has tracked the satellite recently, it might be able to estimate the new position of the satellite, its Doppler Shift, and the code phase to be expected. Equally, the receiver may have no information at all with which it can estimate these quantities. In either case, a guess is made at the signal frequency and the code phase. The receiver generates the PRN code with the selected phase and a carrier with the estimated Doppler Shift, and tries to de-spread the signal. If the signal is not found immediately, a search must be performed through code-frequency space until it is.

In general, searches through code-frequency space are performed by searching code space first at a certain frequency. If the signal is not found, a search through code-space begins at a new frequency. As each code phase is tried, the receiver correlates the replica code with the received signal. The output of the correlator is then integrated over a specific period. At the end of this period a decision has to be made whether the code phase was correct or incorrect based upon the value of the integration result. This decision is made by comparing the absolute value of the integration result with a threshold value. If the result is greater than the threshold value, a correct code phase is flagged. If the result is less than the threshold value, the code phase is rejected as incorrect.

Because the correlation process takes place in the presence of noise, the result of the integration will be affected by noise. In some cases, a correct code phase will be rejected as incorrect because the noise superimposed on the integration result brings it below the threshold. In other cases, a 'false alarm' will occur in which an incorrect code phase is flagged as correct because the noise on the integration result has brought it above the threshold. If a lot of false alarms occur, time will be wasted whilst the receiver has to either re-check and reject them , or accepts them and begins to track the signal before losing lock and having to resume the search. If the chance of detecting the correct code is reduced, the receiver will have to either waste time re-checking all the code phases to be certain that the signal is not at that frequency, or will continue searching at a new frequency when the previous one was actually correct.

It follows, then, that the time to acquisition depends upon the probability of detecting the correct code phase and the probability of false alarms occurring. As a result, the choice of value for the decision threshold will have a significant effect on the performance of the receiver when acquiring a satellite in various signal and noise conditions. A well-chosen threshold will provide rapid acquisition in all signal-to-noise conditions which are expected to be encountered.

DESCRIPTION OF PRIOR ART

In Patent Abstracts of Japan, Publication No. 07140224A there is disclosed a spread spectrum signal tracking device in which a spread spectrum signal received by a receiver is inputted to first and second multipliers, where the carrier components of the signal for an I channel and a Q channel are eliminated independently. First and second correlators measure respective correlation values (i) and (q) according to the inputted base band signals of the I and Q channels and a PN code from a PN code generator, and the correlation values are inputted to respective cyclic integrators. The integrators perform addition of the correlation values (I) and (q) according to the number of cycles which is transmitted from a correlation measuring requirement computing portion, and the values are squared by squares and added together through an adder. These signals squared and added together are inputted to a synchronisation recognition portion determine whether or not the signals are in synchronisation with the PN code.

It is further stated that the purpose of the spread spectrum tracking device is to enable spread spectrum signals to be tracked in a shorter time by dynamically determining a correlation measuring time according to the relationship between the signal level of an estimated spread spectrum signal and an anticipated correlation noise level.

SUMMARY OF THE INVENTION

It is an object of the invention to enable the provision of a DS-CDMA radio receiver in which the time to acquire or re-acquire a signal from satellite is reduced to a minimum.

The invention provides a receiver for spread spectrum direct sequence code division multiple access signals the receiver including a plurality of correlator channels each of which has a threshold level for determining when correlation between a received PRN code from a given satellite and a locally generated PRN code has been achieved, said receiver further including means for assessing the correlation noise level, means for predicting the signal strength of the signal transmitted by the satellite whose code it is being attempted to correlate and means for setting the threshold level of each of the correlators to a value which is dependant on the correlation noise level and the predicted signal strength.

It has been found that the performance of an acquisition system is significantly affected by the signal-to-noise ratio of the receiver signal. With any particular set of signal and noise conditions, a roughly optimum value may be chosen for the threshold which produces a few false alarms and misses detection very rarely. If the same threshold value is used in a situation where there is more noise, more false alarms are produced and the time to acquisition is increased. If the same threshold value is used in a situation where the signal strength is lower, then the chance of detecting the signal is smaller, and the acquisition may take longer as some correlations might be missed.

It has now been recognised that by adopting a variable threshold level which is dependent on the received signal strength and noise level the time to acquire or re-acquire the signal may be optimised.

The received signal strength may be predicted from a knowledge of the transmitted power of the satellite signal and its distance from the receiver. Provided that the receiver has not moved significantly between the last position fix and the attempt to acquire the satellite signals and has not been switched off for so long that the almanac data is out of date it is possible to predict the positions of each of the satellite visible to the receiver to a reasonable degree of accuracy and hence predict the strength of the signal arriving at the receiver. This, of course, neglects the effects of any obstructions or reflected signals.

The means for assessing the correlation noise level may comprise monitoring means for monitoring the output of at least one of the correlators when that correlator is not producing an output indicating correlation with a transmitted spreading code.

This provides a measure of the correlation noise produced. If the received signal strength can be predicted i.e. the positions of the satellite are known sufficiently accurately with respect to the receiver then this information can be used to set the threshold level to an optimum position which minimises the risk of failing to detect real signals because the correlation is too low and maintains the risk of false detection because of correlation with the noise at an acceptable level.

The means for assessing the correlation noise level may comprise setting the PRN code in at least one of the correlators to one which does not correspond to that of a visible satellite and monitoring the output of that correlator.

In many cases is may be sufficient to assess the correlation noise while starting to attempt to acquire a satellite signal since it is unlikely that there will be an immediate correlation between the locally generated PRN code and that transmitted by the satellite. If, however, it is known, for example from stored almanac data that a particular satellite is not visible to the receiver then by using its PRN code it can be ensured that the output of the correlator is caused solely by noise.

The PRN code may be set so as not to correspond to the code transmitted by any of the satellites. In this case there is no need to know the positions of any of the satellites in order to ensure that any correlation results are produced solely by noise.

For re-acquisition of the signal when the signal from a satellite has been interrupted for less than a given period the predicted signal strength may be set at the signal strength of the received signal prior to the interruption.

When GPS receivers are used as sensors in vehicle navigation systems it is possible that the signals from one or more satellites may be temporarily lost due to passing under trees or passing and more especially passing between tall buildings or passing under or through bridges or tunnels. These interruptions are generally of a fairly short duration as satellites soon come back into view. Their signals do, however, have to be re-acquired and because of the relatively short interruption the signal strength is unlikely to have changed significantly. Accordingly by using the same signal strength for setting the threshold level as was being previously received will generally give optimum threshold value to obtain the fastest time for re-acquisition.

The invention further provides a GPS receiver comprising a receiver as claimed in any preceding claim, said receiver having a plurality of reception channels for locking on to signals from a plurality of satellites, and means for calculating the position of the receiver by processing the signals received from the satellites.

The invention has particular application in GPS receivers where the time to acquire the position (which requires signals to be obtained from at least four satellites; assuming that no other position information is available) is a parameter which is frequently of great importance to the user. Whilst in most cases the signals will be acquired from the satellites in parallel it is necessary to obtain all four signals before the position calculation can be made. Further when acquiring a satellite for the first time any performance gain in ensuring recognition of a correct correlation will be further multiplied by the number of frequencies which have to be searched.

BRIEF DESCRIPTION OF THE DRAWING

The above and other features and advantages of the invention will be apparent from the following description, by way of example, of an embodiment of the invention with reference to the accompanying drawings in which:-

DETAILED DESCRIPTION OF THE PREFERRED EMBODIMENTS

Figure 1:
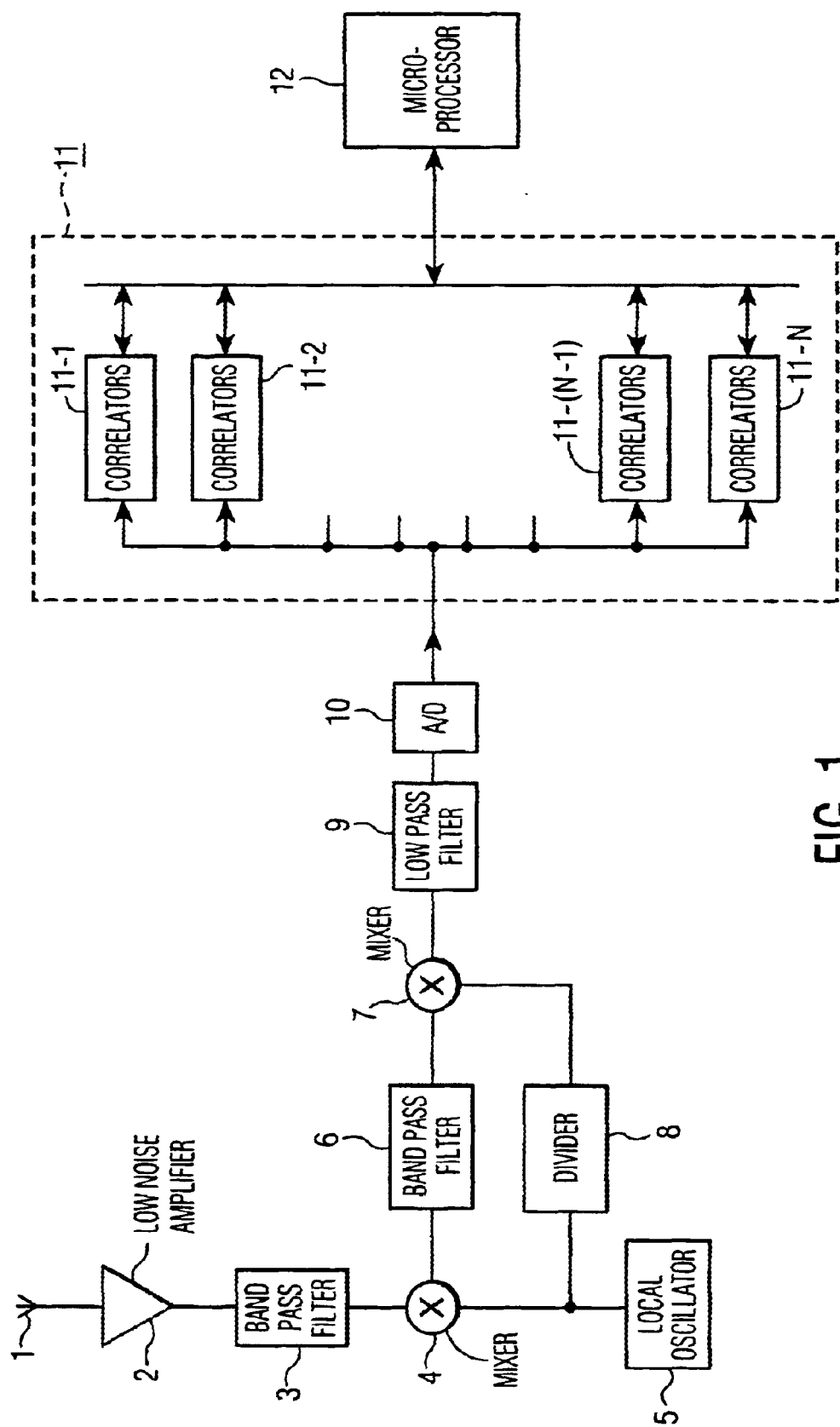
FIG. 1 shows in block schematic form a GPS receiver in which the invention may be embodied.

As shown in FIG. 1 a GPS receiver comprises an aerial 1 which is connected to the input of a low noise amplifier 2 to amplify the incoming signal. This signal is passed through a band pass filter 3 which has its pass band centered on the frequency of 1575 MHz. The output of the band pass filter is fed to a first input of a mixer 4 whose second input is fed from a local oscillator 5. The resultant output is fed to a first intermediate frequency band pass filter 6 which has each pass band centered on a frequency of 42 MHz. The output of the band pass filter 6 fed to a first input of a second mixer 7 whose second input is fed by the local oscillator 5 through a frequency divider 8. The output of the mixer 7 is fed through a low pass filter 9 whose output is connected to the input of an analogue to digital converter ten. The output of the analogue to digital converter ten is fed to a bank of correlators 11. A microprocessor 12 controls the operation of the correlators and receives output signals from them. The microprocessor 12 also calculates from the data received from the correlators the position of the receiver.

All of the satellites broadcast on the same frequency using different PRN codes. Thus the down conversion of all the signals can be performed in parallel using a single front end stage and the separation into multiple channels can be carried out at baseband, and as in the case of the embodiment described is normally done in the digital domain, although this is not essential.

The signal appears at the aerial 1 as a very weak wide band signal. This is first amplified using the low noise amplifier 2. The 1575 MHz signal is then mixed down to a more manageable intermediate frequency. At this point it is still an analogue spread spectrum signal. It is then converted into a digital signal by the analogue to digital converter ten for application to the bank of correlators 11. Generally one correlator channel is required for each satellite to be simultaneously tracked, although time multiplexing of channels is possible.

The acquisition and tracking of the correlation is controlled by the microprocessor 12 which will also perform the position calculation. The bank of correlators 11 and microprocessor 12 form the baseband part of the system which performs several functions. The first is to correlate with the DS-CDMA signals from the satellite vehicles. To do this it has to search for the correct frequency and code position, lock on to the DSSS signal, and obtain accurate timing information from the local code phase. Secondly, it has to down load data from the DS-CDMA signal concerning satellite positional information, such as almanac and ephemeris data, and other data such as satellite vehicle health, atmospheric conditions. Thirdly, it has to calculate pseudo ranges using timing data from the tracking loops and downloaded data to give the range from each satellite vehicle. Fourthly, it has to calculate the position using an appropriate model of the globe to calculate the position and velocity in the required reference system.

As indicated above a major problem is locking on to the satellite signals and in order to do this a search has to be made through both frequency and code space. The invention is particularly concerned with reducing the time taken for this search.

Figure 2:
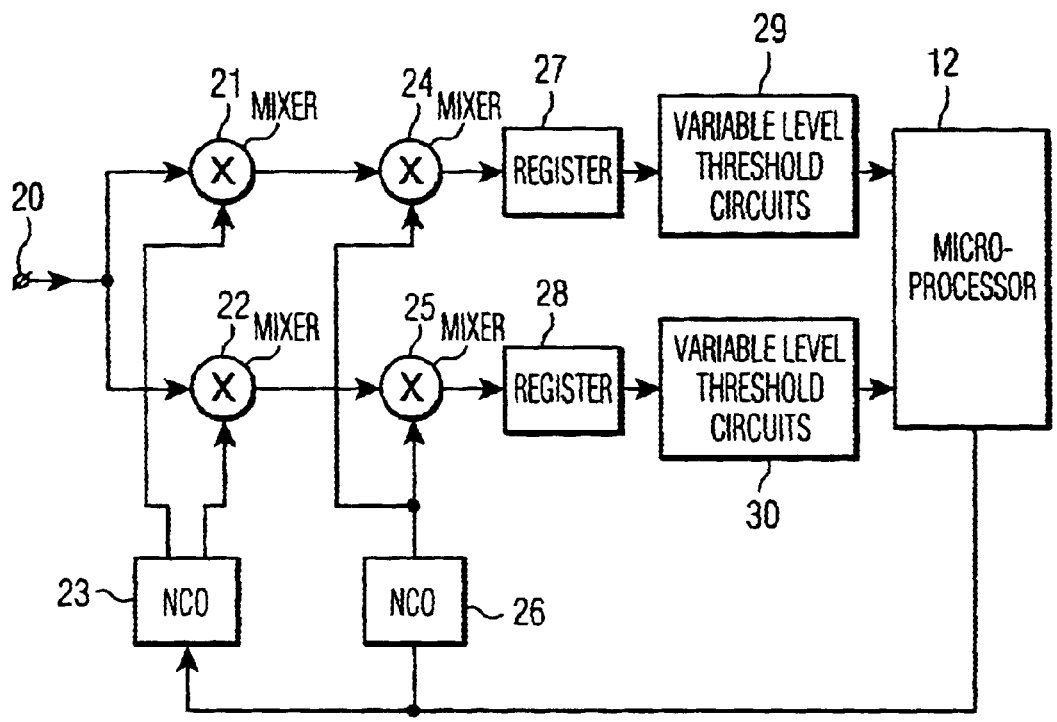
FIG. 2 shows in block schematic form a embodiment of a correlators channel incorporating the invention.

FIG. 2 shows in block schematic form a correlator channel. As shown in FIG. 2 an input 20 which receives the signal produced by the analogue to digital converter ten is connected to first inputs of first and second mixer circuits 21 and 22. The second input of the mixers 21 and 22 are fed with the outputs of a carrier numerically controlled oscillator (NCO) 23. The two outputs of the numerically controlled oscillator 23 are in phase quadrature with each other. The output of the mixers 21 and 22 are fed to first inputs of further mixers 24 and 25. A code numerically controlled oscillator (NCO) 26 produces an output which is fed to the second inputs of the mixers 24 and 25. The outputs of the mixers 24 and 25 are fed to respective integrate and dump registers 27 and 28 whose outputs are fed as data outputs to the microprocessor 12. A control output from the microprocessor 12 is fed to the code and carrier NCOs 23 and 26, to control their output frequencies.

So far, what has been described is a standard correlator for a GPS receiver but as can be seen from FIG. 2 two additional units 29 and 30 are provided in the form of variable level threshold circuits. Although shown as separable blocks in the embodiment of FIG. 2 it may be convenient to implement them as part of the control microprocessor 12. The units 29 and 30 monitor the outputs of the integrate and dump registers 27 and 28. The outputs of the integrate and dump registers 27 and 28 will when the correlator is not locked on to a satellite signal have a mean value of zero. The effect of noise, however, will be to produce a varying output. The magnitude of this noise variance can then be used to select an appropriate threshold level which is sufficiently above the average variance to produce a low number of false correlations.

When the receiver has reasonably up to date almanac data and if it can be assumed that it will not have moved far from the position where it was last locked onto the satellites, as may be the case, for example, where a GPS system is installed in a car which has been parked overnight or even for several days or a few weeks, it is possible to predict the signal strength of the signal being received from any of the satellites since their positions in the constellation will be known at least approximately and hence their distance and elevation from the receiver will also be known. Thus a prediction can be made of the height of the correlation peak and this may be used in addition to the noise measurement to determine an optimum threshold level.

The noise level will be substantially identical for each of the correlator and consequently the monitoring of the noise level could take place in one correlator only with the threshold value for each correlator controlled by the noise level monitored in the one correlator.

The signal strengths will, of course, vary according to which satellite signal the correlator is attempting to lock on to. Consequently the threshold levels in each correlator may be different, since in addition to the noise level they take into account the predicted signal strength.

Figure 3:
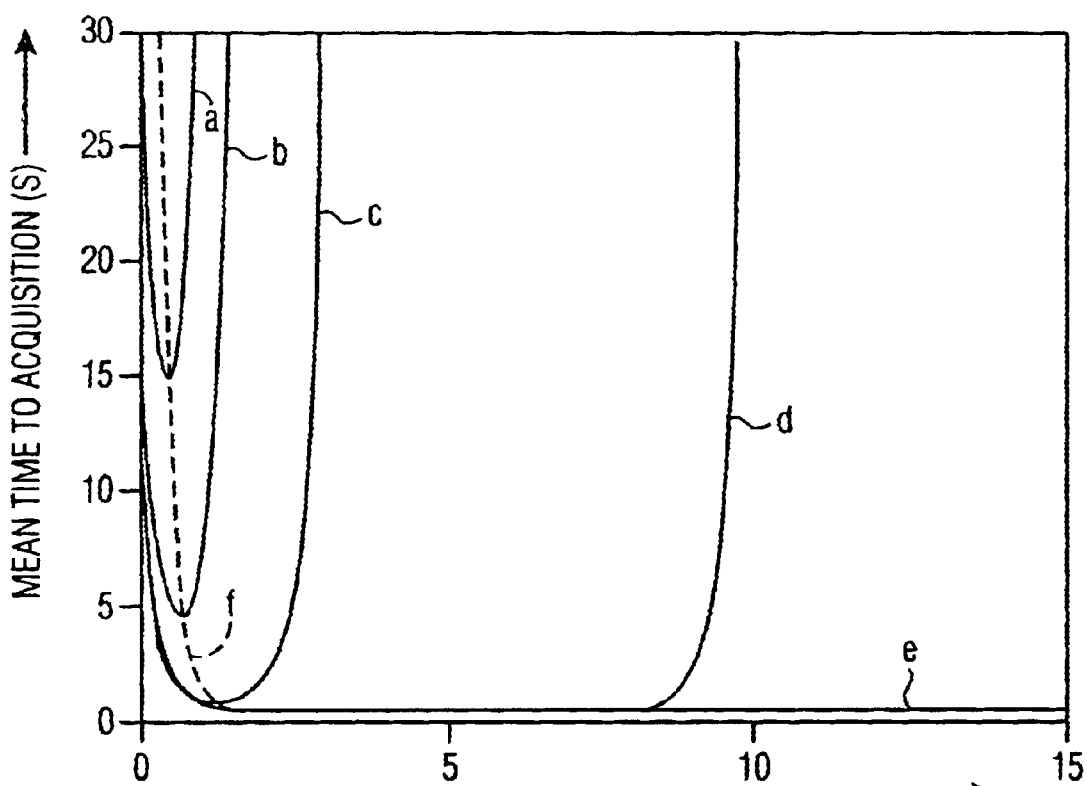
FIG. 3 shows the effect of threshold value on mean time to acquisition of a signal from a satellite.

FIG. 3 shows the effect of the choice of threshold value on the performance of the system under various conditions, and shows a curve giving the optimum threshold values for given signal to noise ratios.

FIG. 3 is a plot of mean time to acquisition against threshold value for a number of different signal to noise ratios. Curve a represents SNR of 2 dB, curve b represents an SNR of 5 dB, curve c represents an SNR of 10 dB, curve d represents an SNR of 20 dB, and curve e represents an SNR of 30 dB. The dotted curve f shows the optimum threshold value for the SNR of the received signal.

There are several conclusions which can be drawn from FIG. 3. First, the choice of threshold value in high signal-to-noise conditions is not as crucial as in low signal signal-to-noise conditions. This is because there is sufficient headroom between the signal and the noise to be able to vary the threshold without significantly altering the probability of detection and the probability of a false alarm occurring. In low signal-to-noise conditions the threshold value should be set precisely in order to give optimum results. If the threshold value is set too high it will be too near to the signal and there will be an immediate penalty in that the probability of detection will be low. If the threshold value is set too low, then the probability of detection will be high, but there will be an immediate penalty as the number of false alarms which occur will increase. Secondly, the optimum threshold value is not the same in all situations. A system which uses a well-chosen fixed threshold may perform well at high signal-to-noise conditions, since there is some leeway in the choice of threshold value, but will perform badly in low signal-to-noise conditions. A considerable performance advantage may be obtained in low signal-to-noise conditions using an adaptive system which measured the noise floor and the signal-to-noise ratio and set its threshold to the appropriate optimum value. By examining the slopes of the curves for low signal-to-noise ratios, it can be seen that the extent of this performance gain may be considerable, and may be directly observed by a human user as a time-saving of several seconds.

Although systems which use fixed threshold values appear to be reliable in most of the signal and noise conditions which are encountered in GPS applications, the performance of a system in low signal-to-noise conditions can be greatly improved by implementing a system which use adaptive threshold values. By using adaptive threshold values mean times to acquisition can be improved by several seconds, and in some cases can be improved by orders of magnitude.

The simulations illustrated in FIG. 3 demonstrate the use of an adaptive threshold which is proportional to the root mean square value of the background noise. The value of this threshold is optimised to suit the prevailing signal-to-noise conditions. In order to implement such a system, two pieces of information must be known: first, the signal-to-noise ratio, and secondly, an absolute measurement of either the signal strength or the noise variance.

When acquiring a satellite signal for the first time, neither the signal strength nor the signal-to-noise ratio is known. It is possible, however, to measure the variance of the background noise. In all cases, a system which has been designed to give a specified performance in low signal-to-noise conditions will perform better in higher signal-to-noise conditions. Thus, the adaptive threshold may be set by using the measured value of the noise variance and an estimate of the lowest SNR which is expected to be encountered. Although this will not give optimum performance, it will provide some performance advantage over the prior art systems which use a fixed threshold value regardless of the noise conditions. When acquiring a satellite for the first time, this performance gain is further multiplied by the number of frequencies which have to be searched. Thus considerable performance benefits can be observed by a user using an adaptive system.

The greatest advantage of an adaptive system is obtained during reacquisition of a satellite signal. A consumer might be willing to wait for a long time for the receiver to acquire the signals from the satellites when he first turned on, but will not tolerate the receiver taking a long time to recover from signal drop-outs. This is particularly pertinent in the mobile situation, when drop-outs can occur frequently as the user passes obstructions such as bridges and trees. If measurements of signal strength and signal-to-noise ratio are taken whilst tracking a satellite signal, then these values may be used to optimise the reacquisition of the satellite signal if it is lost as the user passes under a bridge, for example. In this situation the Doppler Shift on the satellite would not have changed so that only a single search through code space would be required. However, a saving of several seconds on the time taken to re-acquire the signal would be immediately noticeable to the user, particularly in built-up areas where signal drop-outs might be common.

From reading the present disclosure, other modifications will be apparent to persons skilled in the art. Such modifications may involve other features which are already known in the design and use of receivers for DS-CDMA signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A receiver for receiving spread spectrum direct sequence code division multiple access signals (DS-CDMA) including a plurality of correlator channels each of which has a threshold level for determining when correlation between a received pseudo random noise (PRN) code from a given satellite and a locally generated PRN code has been achieved, said receiver further including means for assessing the correlation noise level, means for predicting the signal strength of the signal transmitted by the satellite whose code it is being attempted to correlate and means for setting the threshold level of each of the correlators to a value which is dependent on the correlation noise level and the predicted signal strength.

2. A receiver as claimed in claim 1 in which the means for assessing the correlation noise level comprises monitoring means for monitoring the output of at least one of the correlators when that correlator is not producing an output indicating correlation with a transmitted spreading code.

3. A receiver as claimed in claim 1 which the means for assessing the correlation noise level comprises setting the PRN code in at least one of the correlators to one which does not correspond to that of a visible satellite and monitoring the output of that correlator.

4. A GPS receiver as claimed in claim 3 in which the PRN code does not correspond to any of the codes transmitted by any of the satellites.

5. A receiver as claimed in claim 1 which for reacquisition of the signal when the signal from a satellite has been interrupted for less than a given period the predicted signal strength is set at the signal strength of the received signal prior to the interruption.

\* \* \* \* \*